United States Patent
Yagi et al.

(10) Patent No.: US 9,761,888 B2
(45) Date of Patent: Sep. 12, 2017

(54) FUEL CELL

(71) Applicant: NGK SPARK PLUG CO., LTD., Nagoya-shi, Aichi (JP)

(72) Inventors: Hiroaki Yagi, Konan (JP); Nobuyuki Hotta, Konan (JP); Hideki Ishikawa, Ichinomiya (JP); Hideki Uematsu, Konan (JP); Hiroya Ishikawa, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 342 days.

(21) Appl. No.: 14/373,110

(22) PCT Filed: Jan. 22, 2013

(86) PCT No.: PCT/JP2013/000274
§ 371 (c)(1),
(2) Date: Jul. 18, 2014

(87) PCT Pub. No.: WO2013/114811
PCT Pub. Date: Aug. 8, 2013

(65) Prior Publication Data
US 2015/0056537 A1 Feb. 26, 2015

(30) Foreign Application Priority Data
Jan. 30, 2012 (JP) .................................. 2012-016455

(51) Int. Cl.
*H01M 8/00* (2016.01)
*H01M 8/0247* (2016.01)
(Continued)

(52) U.S. Cl.
CPC ........... *H01M 8/006* (2013.01); *H01M 8/021* (2013.01); *H01M 8/0232* (2013.01);
(Continued)

(58) Field of Classification Search
None
See application file for complete search history.

(56) References Cited

U.S. PATENT DOCUMENTS

2004/0209151 A1* 10/2004 Hase .................... H01M 8/0232
429/439
2004/0241540 A1* 12/2004 Tsutsumi ................ H01M 2/16
429/122
(Continued)

FOREIGN PATENT DOCUMENTS

EP 2330674 A1 6/2011
GB 2434691 A 8/2007
(Continued)

OTHER PUBLICATIONS

Office Action dated Jul. 9, 2015, issued by the Japanese Patent Office in counterpart Japanese Application No. 2013-515593.
(Continued)

*Primary Examiner* — Sarah A Slifka
(74) *Attorney, Agent, or Firm* — Sughrue Mion, PLLC

(57) ABSTRACT

A fuel cell includes a main body which is formed by stacking a cathode layer, an electrolyte layer, and an anode layer, in which the surface of one of the cathode and anode layers serves as a first main surface, and the surface of the other layer serves as a second main surface; a first current collector in contact with the first main surface; and a second current collector in contact with the second main surface. As viewed in a thickness direction, at least a portion of the boundary of a second region of the second current collector corresponding to the second main surface is located within a first region of the first current collector corresponding to the first main surface, and the remaining portion is located within the first region or on the boundary of the first region.

9 Claims, 12 Drawing Sheets

(51) Int. Cl.
   *H01M 8/021*   (2016.01)
   *H01M 8/0232*  (2016.01)
   *H01M 8/248*   (2016.01)
   *H01M 8/124*   (2016.01)

(52) U.S. Cl.
   CPC .......... *H01M 8/0247* (2013.01); *H01M 8/248* (2013.01); *H01M 2008/1293* (2013.01); *H01M 2300/0074* (2013.01)

(56) References Cited

U.S. PATENT DOCUMENTS

| | | | |
|---|---|---|---|
| 2009/0023045 A1 | 1/2009 | Ohmori et al. | |
| 2010/0009231 A1 | 1/2010 | Kim et al. | |

FOREIGN PATENT DOCUMENTS

| | | |
|---|---|---|
| JP | 2001-68132 A | 3/2001 |
| JP | 2004-303478 A | 10/2004 |
| JP | 2005-129281 A | 5/2005 |
| JP | 2005-317241 A | 11/2005 |
| JP | 2008-59797 A | 3/2008 |
| JP | 2009-48997 A | 3/2009 |
| JP | 2009-99308 A | 5/2009 |
| JP | 2009-187887 A | 8/2009 |
| JP | 2009-295437 A | 12/2009 |
| JP | 2010-21135 A | 1/2010 |
| JP | 2010-80201 A | 4/2010 |
| JP | 2011-129309 A | 6/2011 |
| JP | 2011-222152 A | 11/2011 |
| WO | 2006/041397 A1 | 4/2006 |

OTHER PUBLICATIONS

Search Report dated Jul. 21, 2015, issued by the European Patent Office in counterpart European Application No. 13743130.0.
International Search Report, dated Feb. 26, 2013, issued by the International Searching Authority in counterpart International Application No. PCT/JP2013/000274.

* cited by examiner

FUEL CELL

CROSS REFERENCE TO RELATED APPLICATIONS

This application is a National Stage of International Application No. PCT/JP2013/000274 filed Jan. 22, 2013, claiming priority based on Japanese Patent Application No. 2012-016455 filed Jan. 30, 2012, the contents of all of which are incorporated herein by reference in their entirety.

TECHNICAL FIELD

The present invention relates to a fuel cell.

BACKGROUND ART

Fuel batteries have been developed as power generators. There has been known, for example, a solid oxide fuel cell employing a solid oxide as an electrolyte (hereinafter the cell may be referred to as an "SOFC" or referred to simply as a "fuel cell"). An SOFC has, for example, a stack (fuel cell stack) formed of a large number of stacked fuel cell main bodies each including a plate-like solid electrolyte body, and an anode and a cathode provided on the respective surfaces of the electrolyte body. A fuel gas and an oxidant gas (e.g., oxygen contained in air) are supplied to the anode and the cathode, respectively, and chemical reaction is caused to occur by the mediation of the solid electrolyte body, to thereby generate electric power (see, for example, Patent Document 1).

The electric power generated in each fuel cell main body is output by means of an electrically conductive current collector which is in contact with the fuel cell main body.

PRIOR ART DOCUMENT

Patent Document

Patent Document 1: Japanese Patent Application Laid-Open (kokai) No. 2009-99308

SUMMARY OF THE INVENTION

Problems to be Solved by the Invention

However, such a fuel cell may cause a problem in that stress concentrates locally at a specific portion (e.g., a corner-provided portion) between a fuel cell main body (an anode or a cathode) and a current collector during assembly or operation of a fuel cell stack, resulting in possible breakage of the fuel cell main body.

In view of the foregoing, an object of the present invention is to provide a fuel cell in which local stress concentration is reduced between a fuel cell main body and a current collector.

Means for Solving the Problems

The present invention provides a fuel cell comprising a flat-plate-like fuel cell main body which is formed by stacking a cathode layer, an electrolyte layer, and an anode layer, in which the surface of one of the cathode layer and the anode layer serves as a first main surface, and the surface of the other layer serves as a second main surface; a first current collector which is in contact with the first main surface; and a second current collector which is in contact with the second main surface, wherein the second current collector is designed such that it compressively deforms more easily than the first current collector, and such that, as viewed in a thickness direction of the fuel cell main body, at least a portion of a boundary of a second region of the second current collector corresponding to the second main surface is located within a boundary of a first region of the first current collector corresponding to the first main surface, and the remaining portion of the boundary of the second region is located within the boundary of the first region or on the boundary of the first region.

As used herein, the "first region of the first current collector corresponding to the first main surface" corresponds to an area in which the first current collector is in contact with the first main surface, and, when a plurality of first current collectors are provided, a single continuous region including an area between adjacent current collectors. The same shall apply to the second region of the second current collector. At least a portion of the boundary of the second region of the second current collector, which is designed so as to compressively deform more easily than the first current collector, is located within a first region of the first current collector, and the remaining portion of the boundary of the second region is located within the first region or on the boundary of the first region. Thus, when the boundary of the first or second region is determined in consideration of the susceptibility of the first or second current collector to compressive deformation, local stress concentration can be reduced between the first or second current collector and the fuel cell main body, and breakage of the fuel cell main body can be suppressed. Particularly, stress is reduced at a portion where stress is likely to concentrate (e.g., a peripheral portion or corner portion of the fuel cell main body), and therefore breakage of the fuel cell main body is suppressed.

(1) The first region may have a first rectangular boundary having a chamfered corner portion, and the second region may have a second rectangular boundary having a chamfered corner portion.

When the first or second region has a chamfered corner portion, stress can be effectively reduced at the corner portion of the region of the first or second current collector corresponding to the fuel cell main body, at which stress is most likely to concentrate.

(2) In (1) described above, as viewed in a thickness direction of the fuel cell main body, the chamfered corner portion of the second rectangular boundary of the second region may be located inside the chamfered corner portion of the first rectangular boundary of the first region.

When the chamfered portion of the second region is located inside the chamfered portion of the first region, stress concentration can be further reduced at the corner portion of the region of the first or second current collector corresponding to the fuel cell main body.

(3) In (1) or (2) described above, at least one of the chamfered corner portions of the first and second rectangular boundaries may have a generally straight-line shape or a generally arc shape. When the chamfered portion has either of a generally straight-line shape and a generally arc shape, stress concentration can be effectively reduced at the corner portion of the region of the first or second current collector corresponding to the fuel cell main body.

(4) The fuel cell may comprise a plurality of first current collectors, and a plurality of second current collectors, wherein the boundary of the first region may be defined by the plurality of the first current collectors, and the boundary of the second region may be defined by the plurality of the second current collectors.

The fuel cell may comprise a plurality of first current collectors, and a plurality of second current collectors. In this case, the first region and the second region are respectively defined by a plurality of current collectors (first unit collectors and second unit collectors). That is, the first region is defined by a plurality of first unit collectors, whereas the second region is defined by a plurality of second unit collectors. Even in this case, when at least a portion of the boundary of the second region is located within the first region, local stress concentration is reduced.

(5) The first main surface may be the surface of the cathode layer; the second main surface may be the surface of the anode layer; the first current collector which is in contact with the first main surface may contain dense stainless steel; and the second current collector which is in contact with the second main surface may contain porous nickel.

The susceptibilities of the first and second current collectors to compressive deformation can be determined by forming the first current collector from dense stainless steel, and forming the second current collector from porous nickel. That is, the susceptibility of the first or second current collector to compressive deformation can be determined by the type of the material forming the current collector.

(6) The first main surface may be the surface of the cathode layer; the second main surface may be the surface of the anode layer; the first current collector which is in contact with the first main surface may contain dense stainless steel; and the second current collector which is in contact with the second main surface may be formed by a combination of nickel and mica.

The susceptibilities of the first and second current collectors to compressive deformation can be determined by forming the first current collector from dense stainless steel, and forming the second current collector from a composite of nickel and mica.

Effects of the Invention

According to the present invention, there can be provided a fuel cell in which local stress concentration is reduced between a fuel cell main body and a current collector. Specifically, there can be solved a problem which may arise when the current collector is in contact with the cathode or anode of the fuel cell main body; i.e., a problem in that stress is likely to concentrate locally at, for example, a peripheral portion or corner portion of the fuel cell. Therefore, breakage of the fuel cell main body can be reduced.

BRIEF DESCRIPTION OF THE DRAWINGS

FIG. 18 is an enlarged perspective view of the current collector 46a.

MODES FOR CARRYING OUT THE INVENTION

Embodiments to which the present invention is applied will next be described with reference to the drawings. The present invention is not limited to the below-described embodiments, and various embodiments may be carried out so long as they fall within the technical scope of the invention.

(First Embodiment)

Figure 1:
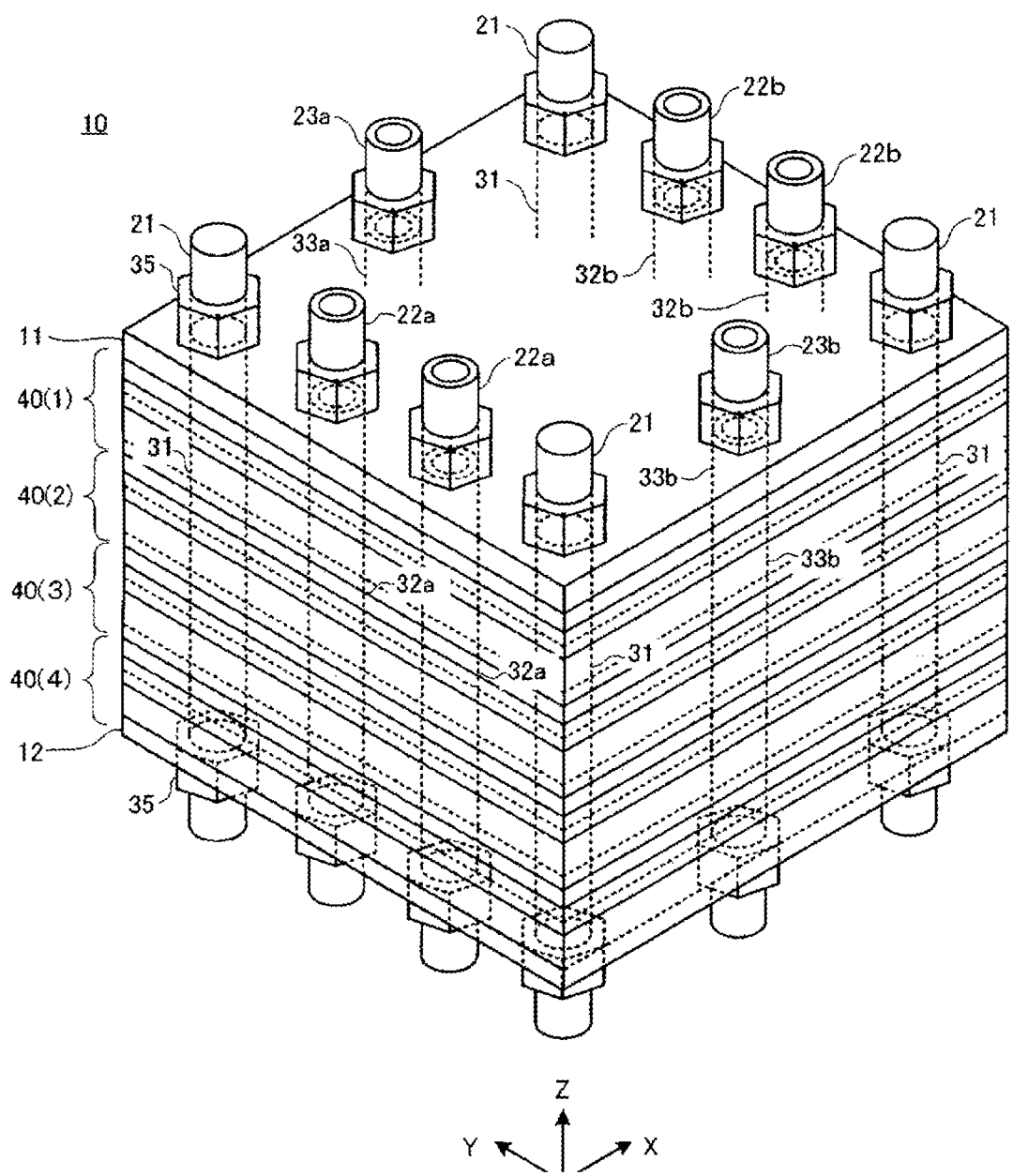
FIG. 1 is a perspective view of a solid oxide fuel cell 10 according to a first embodiment.

FIG. 1 is a perspective view of a solid oxide fuel cell 10 according to a first embodiment of the present invention. The solid oxide fuel cell 10 is a device that can generate electric power through supply of a fuel gas (e.g., hydrogen) and an oxidant gas (e.g., air (specifically, oxygen contained in air)).

The solid oxide fuel cell (fuel cell stack) 10 includes end plates 11 and 12 and fuel cells 40(1) to 40(4) which are stacked and fixed together by means of bolts 21, 22 (22a, 22b), and 23 (23a, 23b) and nuts 35. For the sake of easy understanding, FIG. 1 shows four stacked fuel cells 40(1) to 40(4). However, generally, about 20 fuel cells 40 are stacked.

The end plates 11 and 12 and the fuel cells 40(1) to 40(4) have through holes 31, 32 (32a, 32b), and 33 (33a, 33b) for receiving to the bolts 21, 22 (22a, 22b), and 23 (23a, 23b). The end plates 11 and 12 serve as plates for pressing and supporting the stacked fuel cells 40(1) to 40(4), and also serve as output terminals of current from the fuel cells 40(1) to 40(4).

Figure 2:
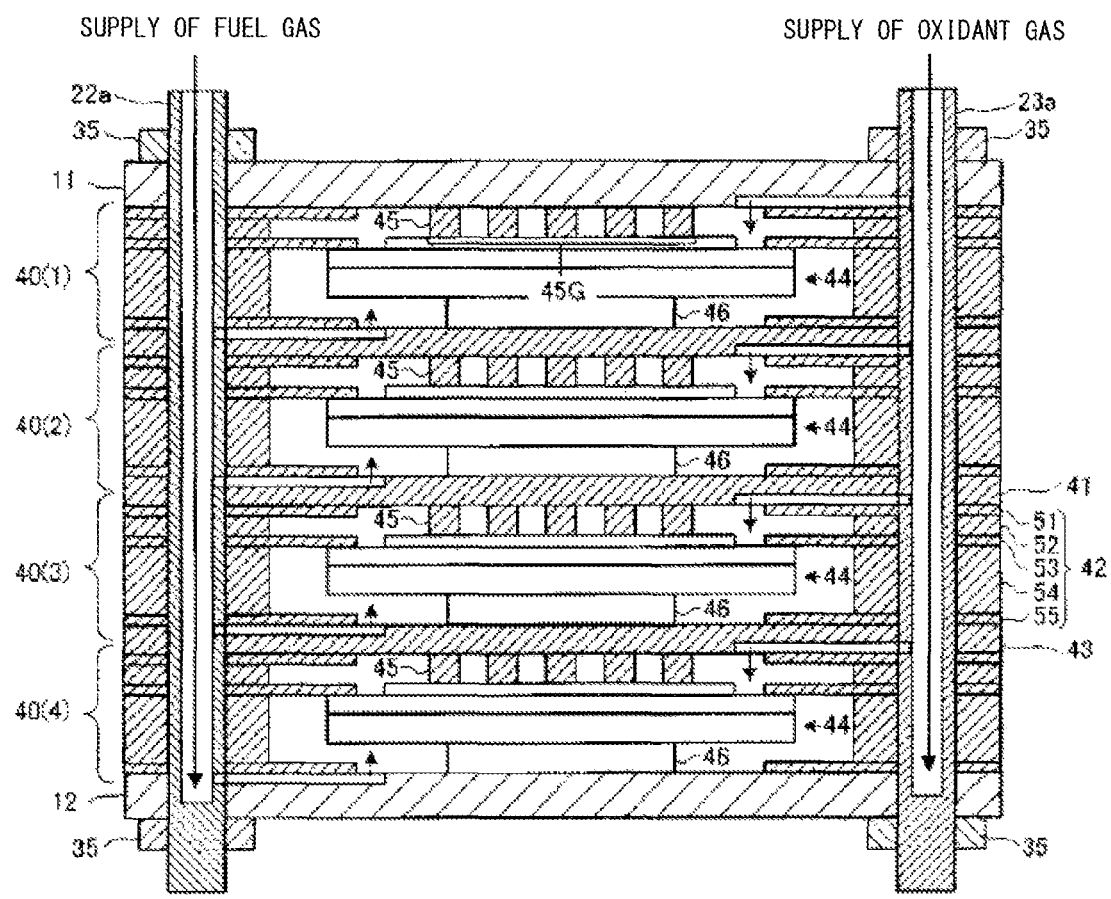
FIG. 2 is a schematic cross-sectional view of the solid oxide fuel cell 10.
Figure 3:
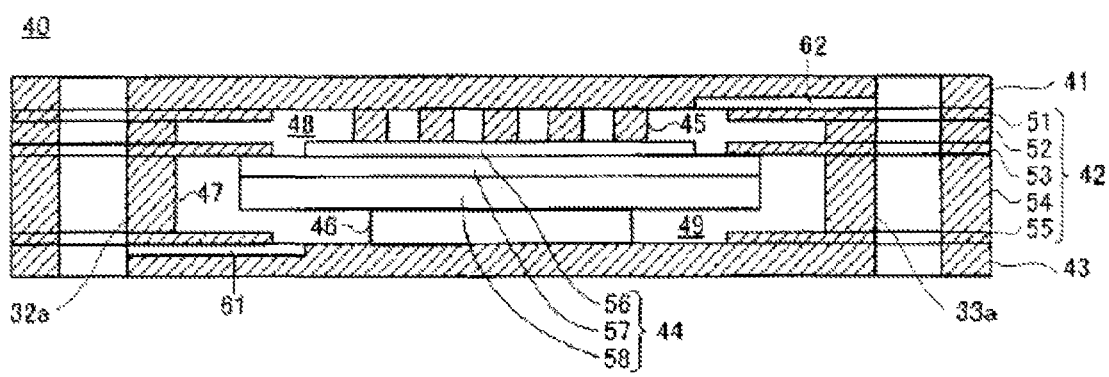
FIG. 3 is a cross-sectional view of a fuel cell 40.

FIG. 2 is a schematic cross-sectional view of the solid oxide fuel cell 10. FIG. 3 is a cross-sectional view of each fuel cell 40.

As shown in FIG. 3, the fuel cell 40 is a so-called anode-supported-membrane-type fuel cell, and includes interconnectors 41 and 43, a frame unit 42, a cell main body (fuel cell main body) 44, current collectors 45, and (second) current collectors 46.

In the anode-supported-membrane-type fuel cell, the thickness of an anode 58 is larger than that of a cathode 56 or a solid electrolyte body 57.

The interconnectors 41 and 43 are a pair of upper and lower electrically conductive (e.g., metallic) plates for securing electrical conduction between adjacent fuel cells 40 and blocking gas paths.

Only a single interconnector (41 or 43) is provided between adjacent fuel cells 40 (since the in-series connected two fuel cells 40 share a single interconnector). The interconnectors 41 and 43 of the uppermost fuel cell 40(1) and the lowermost fuel cell 40(4) are respectively replaced with the end plates 11 and 12.

The frame unit 42 has an opening 47. The opening 47 is hermetically sealed and divided into an oxidant gas path 48 and a fuel gas path 49. The frame unit 42 includes insulating frames 51 and 55, a cathode frame 52, a separator (peripheral portion thereof) 53, and an anode frame 54.

The insulating frames 51 and 55 are ceramic frames for electrically insulating the interconnectors 41 and 43, and are respectively provided on the sides toward the cathode 56 and the anode 58. Alternatively, one of the insulating flames 51 and 55 may be omitted.

The cathode frame 52 is a metallic frame provided on the side toward the oxidant gas path 48.

The separator 53 is a metallic frame employed for bonding the cell main body 44, and blocking the oxidant gas path 48 and the fuel gas path 49.

The anode frame 54 is a metallic frame provided on the side toward the fuel gas path 49.

The frame unit 42 has the through holes 31, 32 (32a, 32b), and 33 (33a, 33b) corresponding to the bolts 21, 22 (22a, 22b), and 23 (23a, 23b).

The cell main body (fuel cell main body) 44 is formed by stacking the cathode (may also be referred to as "cathode layer" or "air electrode") 56, the solid electrolyte body (electrolyte layer) 57, and the anode (may also be referred to as "anode layer" or "fuel electrode") 58. The cathode 56 and the anode 58 are respectively provided on the solid electrolyte body 57 on the side toward the oxidant gas path 48 and on the side toward the fuel gas path 49. The cathode 56 may be formed of a perovskite oxide, a noble metal, or a cermet of a noble metal and a ceramic material. The solid electrolyte body 57 may be formed of YSZ, ScSZ, SDC, GDC, a perovskite oxide, or a like material. The anode 58 may be formed of Ni or a cermet of Ni and a ceramic material.

As shown in FIGS. 2 and 3, the through hole 32a is spatially connected to the opening 47 via a notch 61 above the interconnectors 41 and 43 so as to permit circulation of a fuel gas between the through hole 32a and the opening 47. Meanwhile, the through hole 33a is spatially connected to the opening 47 via a notch 62 below the interconnectors 41 and 43 so as to permit circulation of an oxidant gas between the through hole 33a and the opening 47.

The current collectors 45 on the cathode 56 are provided for securing electrical conduction between the cell main body 44 (cathode 56) and the interconnector 41, and is formed of a dense metal material.

The current collectors 46 on the anode 58 are provided for securing electrical conduction between the cell main body 44 (anode 58) and the interconnector 43, and may be formed of a material which compressively deforms more readily than the current collectors 45 (e.g., a porous metal material).

Examples of the material of each current collector 45 include electrically conductive, heat-resistant metal materials, such as stainless steel, nickel-base alloys, and chromium-base alloys. Specific examples of stainless steel include ferritic stainless steel, martensitic stainless steel, and austenitic stainless steel. Examples of ferritic stainless steel include SUS430, SUS434, SUS405, and SUS444. Examples of martensitic stainless steel include SUS403, SUS410, and SUS431. Examples of austenitic stainless steel include SUS201, SUS301, and SUS305.

Examples of the material of each current collector 46 include metal materials having electrical conductivity, heat resistance, and oxidation resistance, such as nickel, nickel-base alloys, and stainless steel. When the current collectors 46 having a porous structure are formed of such a metal material (e.g., nickel), the current collectors 46 become relatively susceptible to compressive deformation. The current collectors 46 may be formed of a metal wire or a metal net. Alternatively, as described in a second embodiment hereinbelow, the current collectors 46 may be formed by bending a metal plate material.

The susceptibility of the current collectors 45 and 46 to compressive deformation can be evaluated by means of a "load-strain" curve. Specifically, current collectors having the same shape are compressed by means of a compression tester at ambient temperature, to thereby obtain a "load-strain" curve. Among current collectors to which the same load has been applied, a current collector exhibiting a large strain amount can be regarded as a "current collector susceptible to compressive deformation."

Optionally, an adhesion layer formed of, for example, a silver-palladium alloy (palladium content: 1 to 10 mol %) may be provided between the cathode 56 and the current collector 45. Such an adhesion layer can secure electrical conduction between the cathode 56 and the current collectors 45, and can also achieve bonding of the cathode 56 and the current collectors 45.

Such an adhesion layer may be formed through, for example, the following procedure. Specifically, an Ag—Pd electrically conductive paste containing Ag—Pd powder (Pd: 1 mol %), ethyl cellulose, and an organic solvent is applied (or printed) onto the surface (surface on the side toward the cathode 56) of each current collector 45. At the operation temperature (e.g., 700° C.) of the solid oxide fuel cell 10, the electrically conductive paste adheres to the cathode 56 or the current collectors 45 through removal of ethyl cellulose, etc. and softening of the Ag—Pd alloy. At the termination of operation, the resultant adhesion layer is strongly bonded together with the cathode 56 and the current collectors 45. Thus, the adhesion layer formed between the cathode 56 and the current collectors 45 can reliably improve electrical conduction therebetween.

The bolts 21 are members for pressing and fixing the stacked end plates 11 and 12 and fuel cells 40(1) to 40(4).

The bolts 22 (22*a*, 22*b*) are members for circulating a fuel gas, and each have a hole through which a fuel gas flows (fuel gas path). The bolts 23 (23*a*, 23*b*) are members for circulating an oxidant gas, and each have a hole through which an oxidant gas flows (oxidant gas path).

A fuel gas and an oxidant gas flow into and out of the fuel cell 40 as follows.

Specifically, a fuel gas flows into and out of the fuel gas path 49 through the hole provided in each bolt 22 (22*a*, 22*b*), and an oxidant gas flows into and out of the oxidant gas path 48 through the hole provided in each bolt 23 (23*a*, 23*b*).

Figure 4:
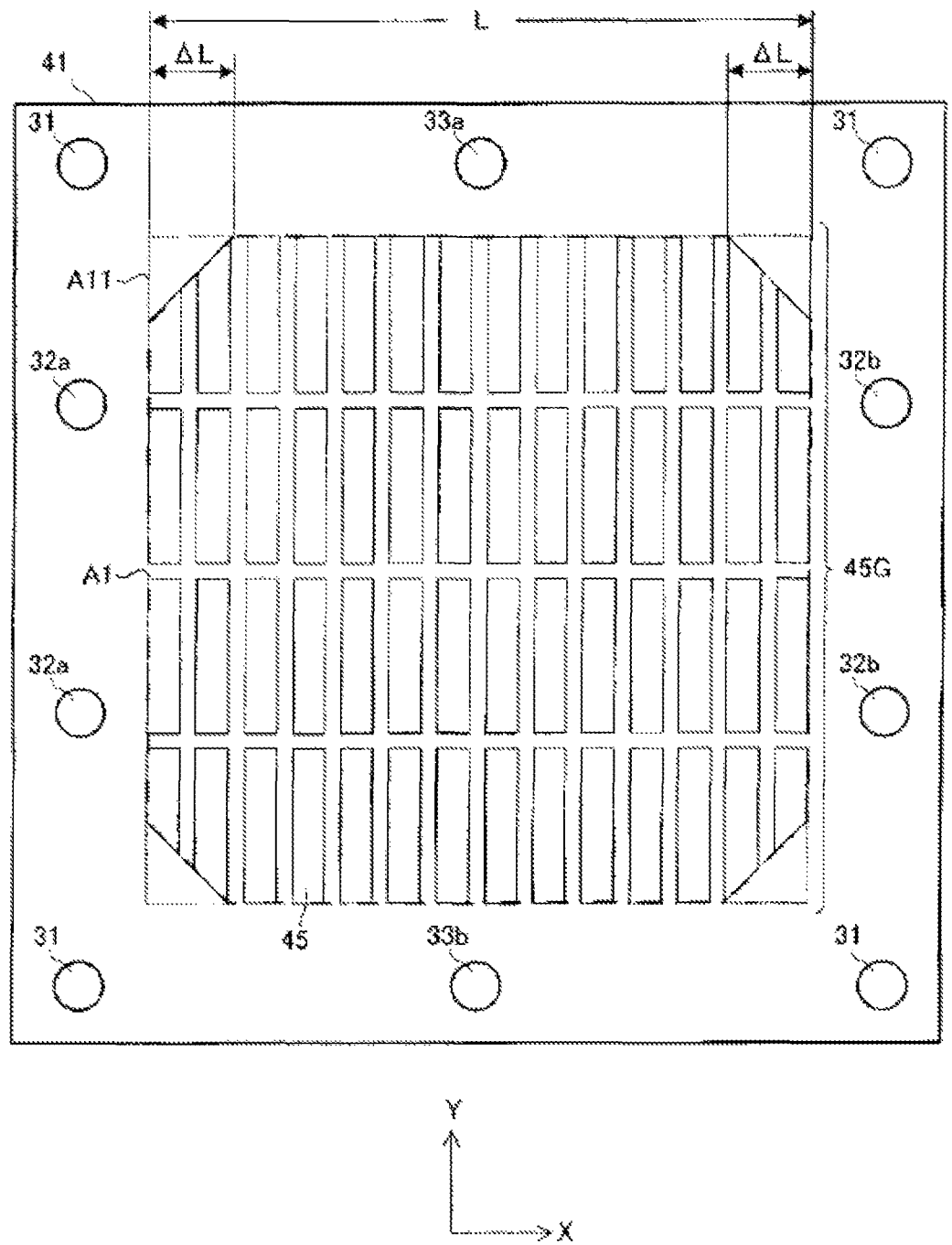
FIG. 4 is a plan view of a current collector 45 provided on an interconnector 41.
Figure 5:
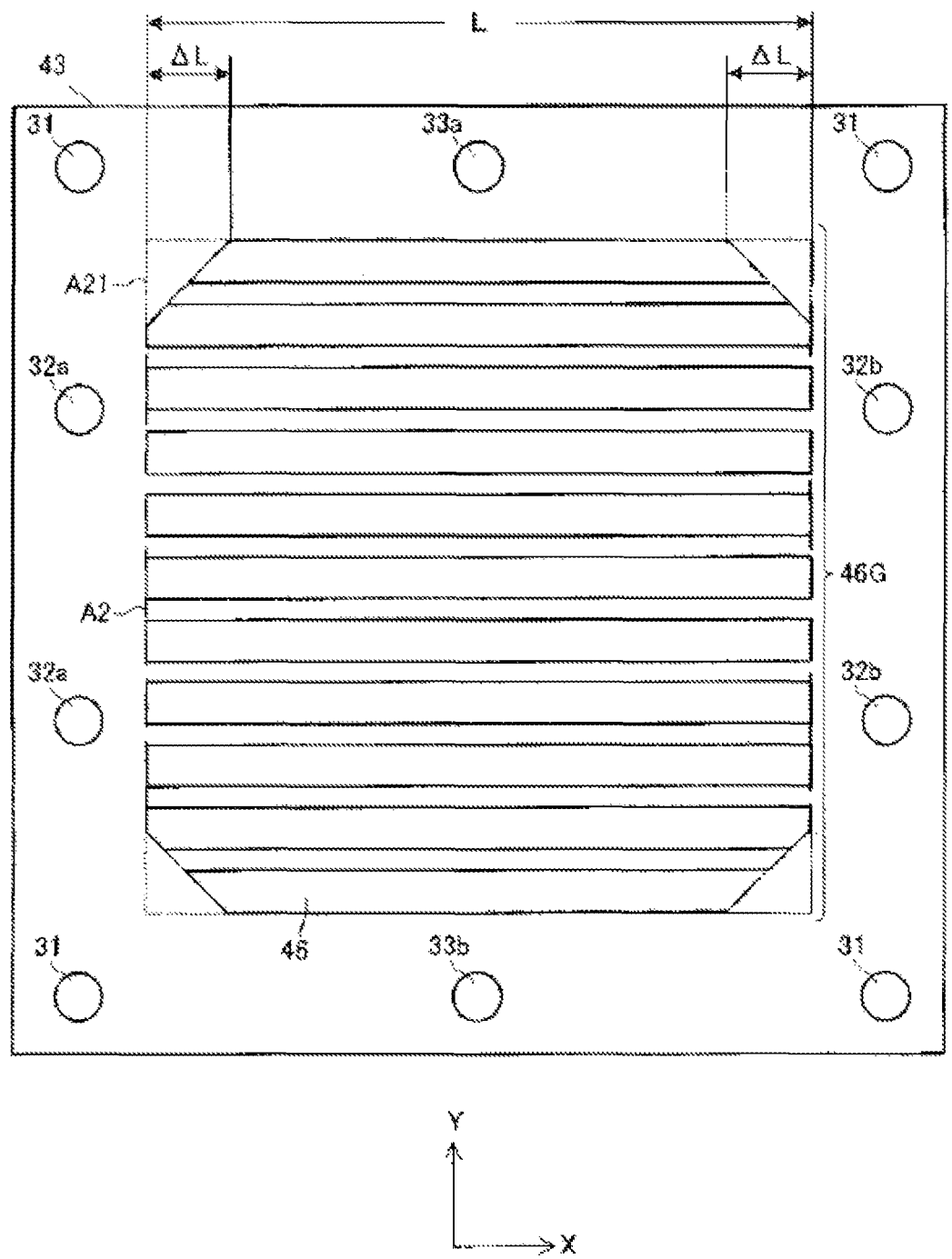
FIG. 5 is a plan view of a current collector 46 provided on an interconnector 43.

FIGS. 4 and 5 are plan views of the current collectors 45 provided on the interconnector 41, and the second current collectors 46 provided on the interconnector 43, respectively. A plurality of current collectors 45 and a plurality of second current collectors 46 are provided on the interconnectors 41 and 43, respectively.

In order to more clearly distinguish each current collector 45 and each second current collector 46 from a plurality of current collectors 45 and a plurality of second current collectors 46, they may be referred to as follows. Specifically, each current collector 45 and each second current collector 46 may also be referred to as a "first unit collector 45" and a "second unit collector 46," respectively. Also, the entire current collectors 45 and the entire second current collectors 46 may be referred to as "current collector 45G" and "second current collector 46G," respectively.

The outer peripheries (contours) of the entire current collectors 45 (current collector 45G) and the entire second current collectors 46 (second current collector 46G) define regions A1 and A2, respectively. Specifically, the region A1 includes the area occupied by the first unit collectors 45 and the area between adjacent first unit collectors 45, and the region A2 includes the area occupied by the second unit collectors 46 and the area between adjacent second unit collectors 46.

Specifically, each of the regions A1 and A2 has a generally rectangular shape, and does not include a region A11 or A21 at each of four corner portions thereof. That is, each of the regions A1 and A2 has a corner-chamfered rectangular "boundary." The current collectors 45 and 46 are provided inside the "boundary" so as not to be located in the region A11 or A21, respectively.

Thus, the corner portions of the regions A1 and A2 of the current collector 45G and the second current collector 46G corresponding to the main surface of the cell main body 44 are chamfered. Therefore, stress concentration is reduced at the corner portions of the regions A1 and A2 of the current collector 45G and the second current collector 46G corresponding to the fuel cell main body 44 (cathode, anode), whereby breakage of the fuel cell main body 44 can be suppressed.

In the present embodiment, the corner portions of both the regions A1 and A2 are chamfered. However, even when the corner portions of either of the regions A1 and A2 are chamfered, stress concentration is reduced, and breakage of the fuel cell main body 44 can be suppressed.

Figure 6:
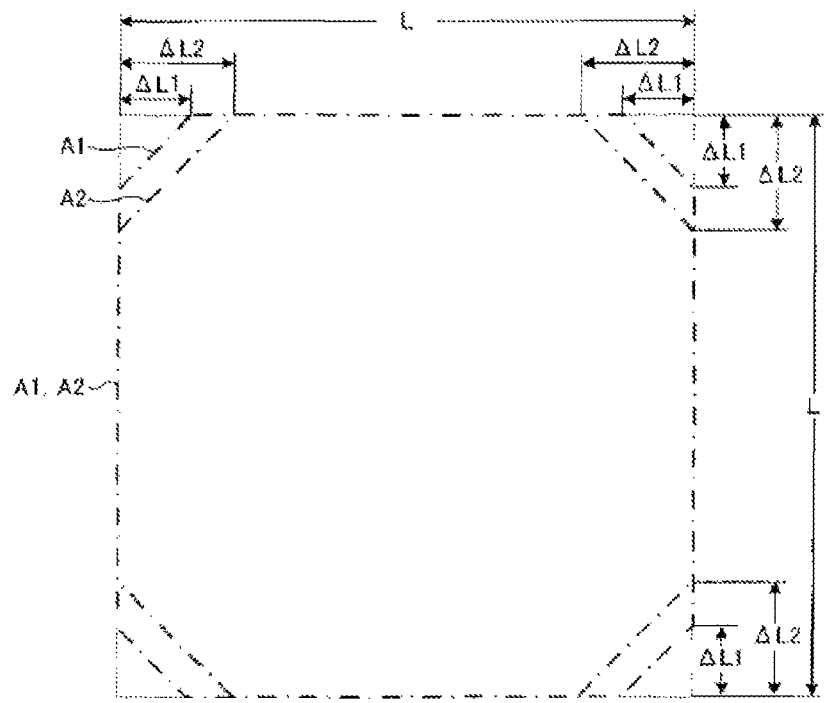
FIG. 6 shows regions A1 and A2 subjected to C chamfering.
Figure 7:
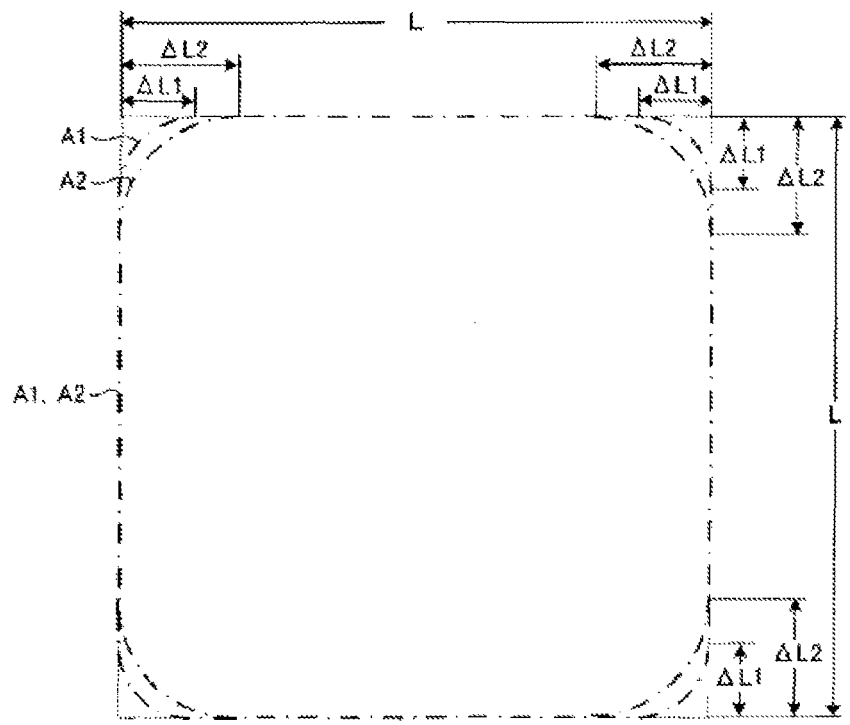
FIG. 7 shows regions A1 and A2 subjected to chamfering.
Figure 8:
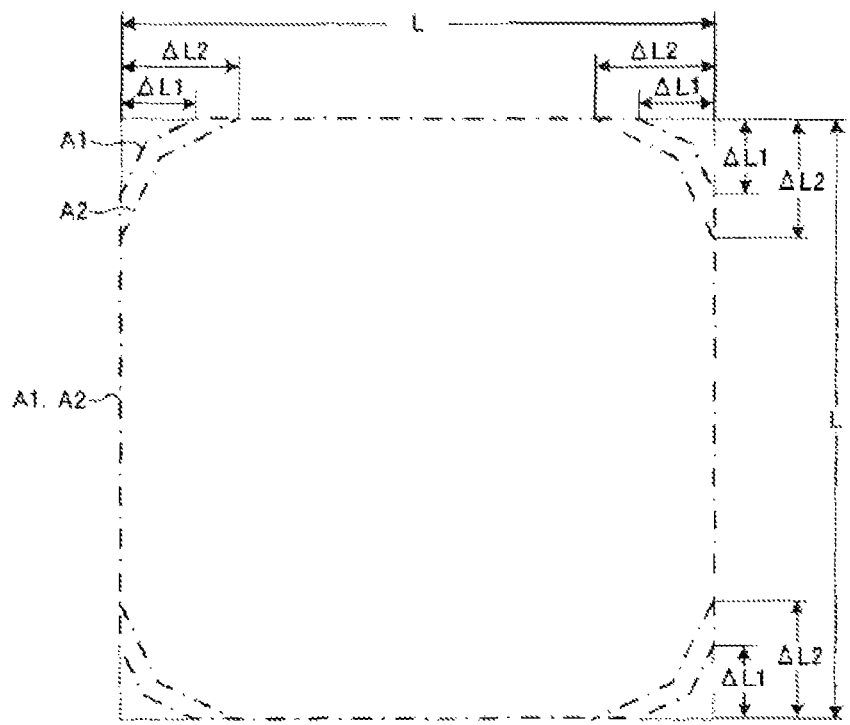
FIG. 8 shows regions A1 and A2 subjected to another chamfering.
Figure 9:
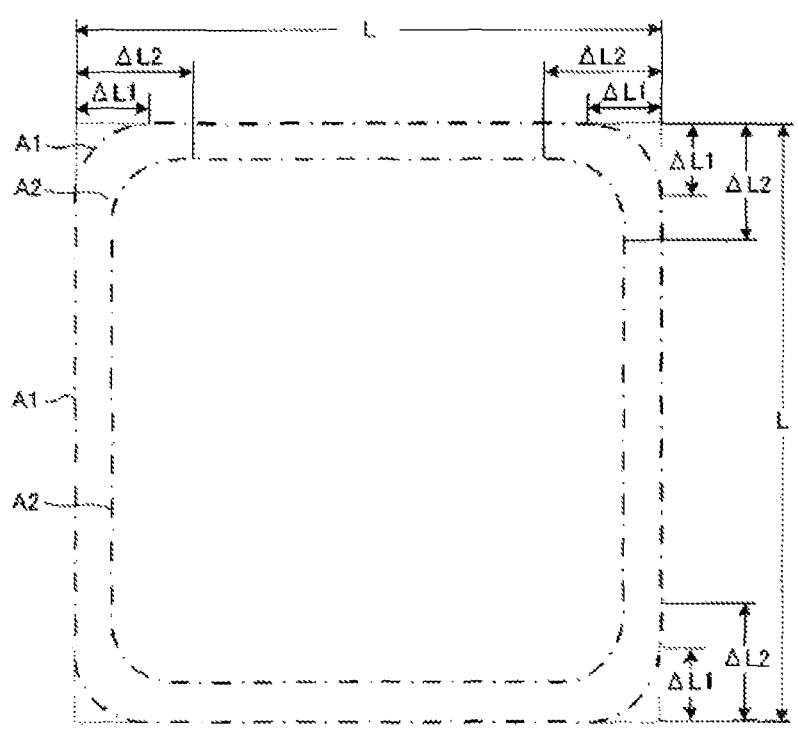
FIG. 9 shows other regions A1 and A2.

For the sake of easy understanding, FIGS. 6 to 9 show the region A1 without showing the current collector 45. FIGS. 6 to 9 correspond to the regions A1 and A2 as viewed in a thickness direction (Z-direction) of the fuel cell main body 44. As shown in FIG. 6, the corner portions of the region A1 are straightly chamfered (C chamfering). As shown in FIG. 7, the corner portions of the region A1 are arcuately chamfered (R chamfering). As shown in FIG. 8, the corner portions of the region A1 are chamfered to assume a shape of combination of two straight lines (another chamfering). As shown in FIG. 9, the entire boundary of the region A2 is located within the region A1. Also, as shown in FIG. 9, the corner portions of both the regions A1 and A2 are arcuately chamfered (R chamfering).

As shown in FIGS. 6 and 7, even when the corner portions of the region A1 are subjected to any of C chamfering and R chamfering, stress concentration is reduced. Also, even when the corner portions of the region A2 are subjected to any of C chamfering and R chamfering, stress concentration is reduced.

As shown in FIG. 8, even when the corners are chamfered to assume a shape intermediate between straight line, arc, etc.; for example, a shape formed by connecting a plurality of straight lines (in FIG. 8, a shape formed by connecting two straight lines) or a shape formed by a straight line and an arc, stress concentration is reduced.

At least a portion of the boundary of the region A2 is located within the region A1. That is, the chamfered portions of the rectangular region A2 are located inside the chamfered portions of the rectangular region A1. This corresponds to the difference in the below-described amounts of chamfering M1 and M2. As described hereinbelow, stress concentration can be reduced by adjusting the size of the region A1 or A2 in consideration of the susceptibility of the current collectors 45 and 46 to compressive deformation.

The remaining portion of the region A2 is located within the region A1 or on the boundary of the region A1. As shown in these figures, the boundaries of the regions A1 and A2 coincide with each other, except for the corner portions. For example, the boundaries of the regions A1 and A2 may be provided so as to coincide with each other as viewed in the Z-direction (except for the corner portions). In this case, stress is effectively reduced at the corner portions, at which stress is most likely to concentrate.

Although not shown in the figures, the boundary of the region A2 may be located inside the region A1 at a portion other than the corner portions. In this case, local stress concentration is also reduced at a peripheral portion of the cell main body 44.

As shown in FIG. 9, the boundary of the region A2 may be located inside the region A1 at both the corner portions and a portion other than the corner portions. In this case, local stress concentration can be reduced at the corner portions, at which stress is most likely to concentrate, as well as at a peripheral portion.

The amounts of chamfering M1 and M2 (%) in the respective regions A1 and A2 can be defined by the following formula (1).

$$M1 = (\Delta L1/L) \times 100$$

$$M2 = (\Delta L2/L) \times 100 \qquad \text{formula (1)}$$

L: length of side in region A1 or A2
ΔL1: width of chamfered region A11
ΔL2: width of chamfered region A21

As shown in FIGS. 6 to 9, the amount of chamfering M2 is larger than the amount of chamfering M1 (M2>M1).

The aforementioned definition may be applied to any of C chamfering and R chamfering. In this case, the region A1 has a generally square shape (i.e., adjacent sides have the same length). In the case where the regions A1 and A2 have a generally rectangular shape (i.e., sides having different lengths (long side and short side) are present), the length of a short side is employed as the length L.

In the present embodiment, the amount of chamfering M2 in the region A2 is larger than the amount of chamfering M1 in the region A1. Thus, as described hereinbelow, stress concentration can be further reduced at the corner portions of the regions A1 and A2, and breakage of the cell main body 44 can be more reliably suppressed.

Stress concentration can be further reduced by varying the sizes of the regions A1 and A2 of the current collectors 45 and 46 on the sides toward the anode and the cathode. Specifically, when the boundary of the region A2 is located within the region A1 at both the corner portions and a portion other than the corner portions, local stress concentration can be reduced at the corner portions, at which stress is most likely to concentrate, as well as at a peripheral portion.

Figure 10:
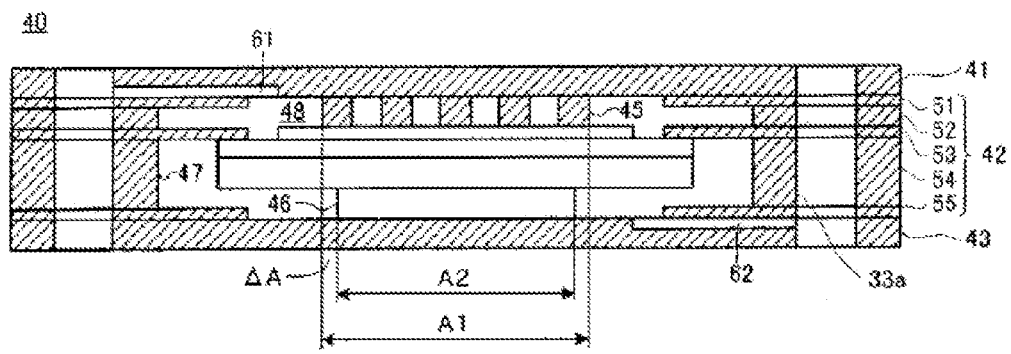
FIG. 10 is a schematic cross-sectional view of the regions A1 and A2 of the solid oxide fuel cell 10.
Figure 11:
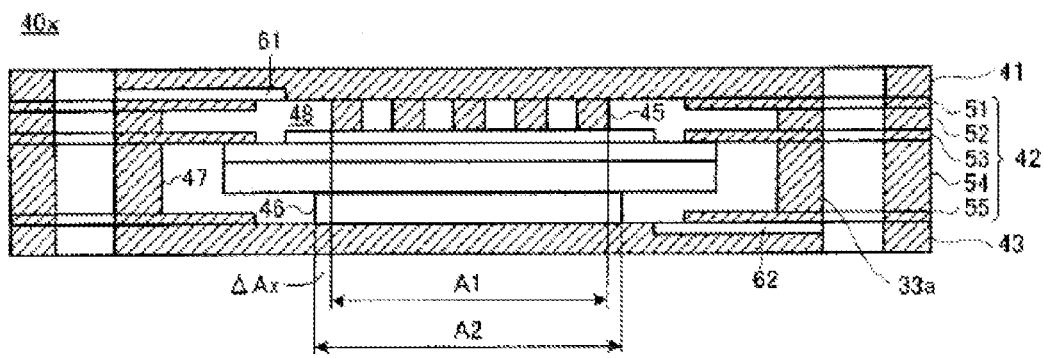
FIG. 11 is a schematic cross-sectional view of regions A1 and A2 of a comparative solid oxide fuel cell 10x.

FIGS. 10 and 11 respectively show the relationship between the regions A1 and A2 (in cross section) in the fuel cell 40 of the present embodiment and a comparative fuel cell 40x.

As shown in FIG. 10, in the fuel cell 40, the region A2 is located within the region A1; i.e., the current collectors 45, which are relatively less susceptible to compressive deformation, extend toward a region ΔA between the regions A1 and A2 in a horizontal direction with respect to the current collectors 46.

Meanwhile, as shown in FIG. 11, in the comparative fuel cell 40x, the region A1 is located within the region A2; i.e., the current collectors 46, which are relatively more susceptible to compressive deformation, extend toward a region ΔAx between the regions A1 and A2 in a horizontal direction with respect to the current collectors 45.

Thus, in the fuel cell 40x shown in FIG. 11, the current collectors 46, which are relatively more susceptible to compressive deformation, are located in the region ΔAx, whereas the current collectors 45, which are relatively less susceptible to compressive deformation, are not located in the region ΔAx. Therefore, deformation of the cell main body 44 is more likely to occur in the region ΔAx. Meanwhile, in the region A1, the current collectors 45, which are relatively less susceptible to compressive deformation, are located (together with the current collectors 46, which are relatively more susceptible to compressive deformation). Therefore, deformation of the cell main body 44 is less likely to occur in the region A1. That is, the cell main body 44 has both the region ΔAx (which is relatively more likely to deform) and the region A1 (which is relatively less likely to deform). Therefore, shearing stress may concentrate on the cell main body 44 at the boundary between the regions A1 and ΔAx, resulting in breakage of the cell main body 44.

In contrast, in the fuel cell 40 shown in FIG. 10, there is no region in which only the current collectors 46, which are relatively more susceptible to compressive deformation, are located. Therefore, stress concentration on the cell main body 44 is reduced at the boundary between the regions A2 and ΔA, and breakage of the cell main body 44 is less likely to occur.

Figure 12:
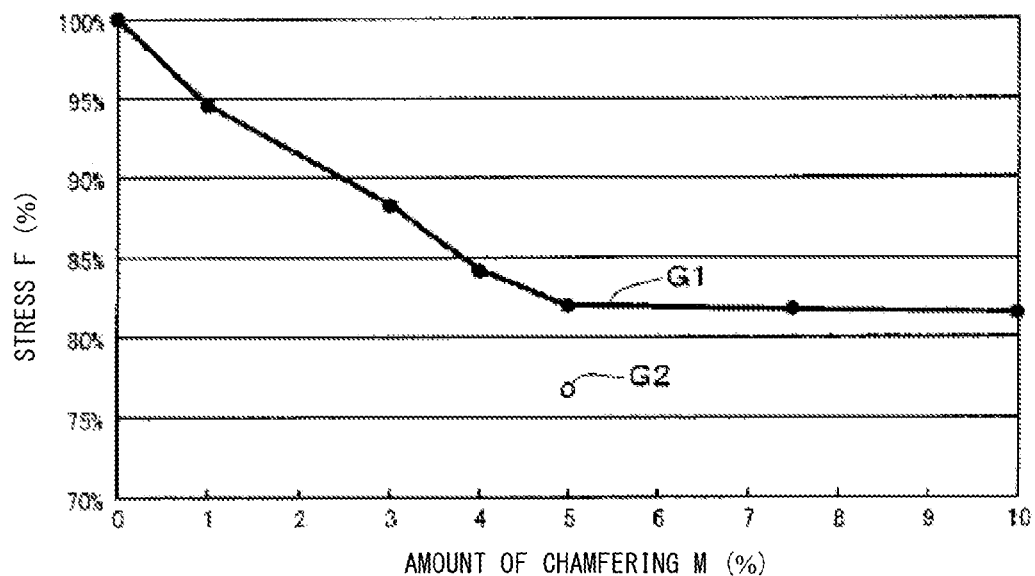
FIG. 12 is a graph showing an example of the relationship between the amount of chamfering M and stress F.

FIG. 12 is a graph showing an example of the relationship between the amount of chamfering M (%) and stress F (%). Stress F (%) is defined by the following formula (2).

$$F=(F1/F0)\times 100 \qquad \text{formula (2)}$$

F1: maximum stress in chamfered region A1 or A2
F0: maximum stress in non-chamfered region A1 or A2

Now will be described the results of simulation under the following conditions.

In data G1 of the graph, the amount of chamfering M1 in the region A1 is equal to the amount of chamfering M2 in the region A2. In data G2 of the graph, the amount of chamfering M1 is 5%, and the amount of chamfering M2 is 10%. While the outer periphery of the separator 53 is fixed, the current collectors 45 and 46 are pressed in the negative Z-direction shown in FIG. 1.

As is clear from data G1 of the graph, when the regions A1 and A2 are chamfered, stress concentration is reduced. As is also clear from data G2 of the graph, when the amount of chamfering M2 in the region A2 is larger than the amount of chamfering M1 in the region A1, stress concentration is further reduced.

Figure 13:
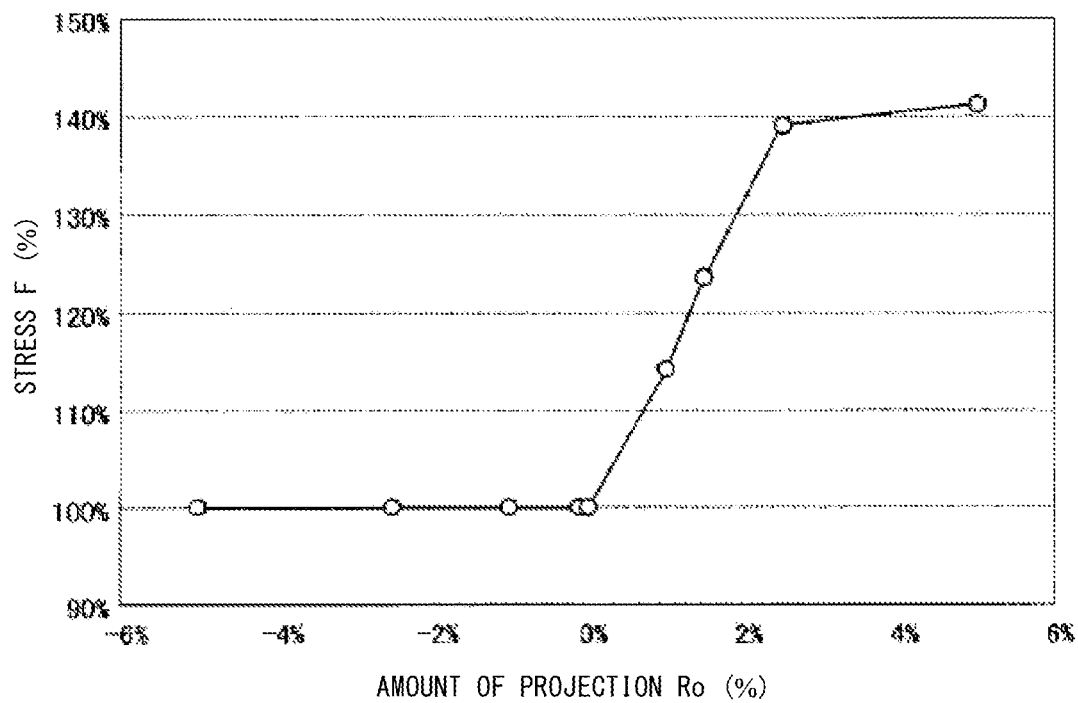
FIG. 13 is a graph showing an example of the relationship between the amount of projection Ro and stress F.

FIG. 13 is a graph showing the results of simulation of the amount of projection Ro (%) and stress F (%).

The amount of projection Ro (%) corresponds to the ratio of the current collector 46 exhibiting lower rigidity (i.e., respectively more susceptible to compressive deformation) to the current collector 45 exhibiting higher rigidity (i.e., respectively less susceptible to compressive deformation), and is represented by the following formula. Specifically, each of the regions A1 and A2 has a rectangular shape (i.e., not chamfered), and the length L1 of a side of the region A1 differs from the length L2 of a side of the region A2.

$$Ro\ (\%)=[(L2-L1)/L1]\times 100$$

L1: length of side (short side) of region A1
L2: length of side (short side) of region A2

A positive value of the amount of projection Ro (%) shows the case where the current collector 46, which is relatively more susceptible to compressive deformation, projects outward with respect to the current collector 45 (corresponding to the case shown in FIG. 11). Meanwhile, a negative value of the amount of projection Ro (%) shows the case where the current collector 45, which is relatively less susceptible to compressive deformation, projects outward with respect to the current collector 46 (corresponding to the case shown in FIG. 10).

As is clear from the simulation results, stress F is small in the fuel cell 40 shown in FIG. 10, and thus breakage is less likely to occur in the cell main body 44.

FIGS. 14A to 14C and FIGS. 15A to 15C show the relationship between the contour and region of the current collector 45G or the second current collector 46G in the case where the number of current collectors 45 or second current collectors 46 is varied. For the sake of convenience, these figures show the relationship between the contour and region of the current collector in the case where the region A1 is the same as the region A2. That is, FIGS. 14A to 14C and FIGS. 15A to 15C show the relationship between the contour and region of the current collector, but do not show the relationship between the regions A1 and A2.

Figure 14A:
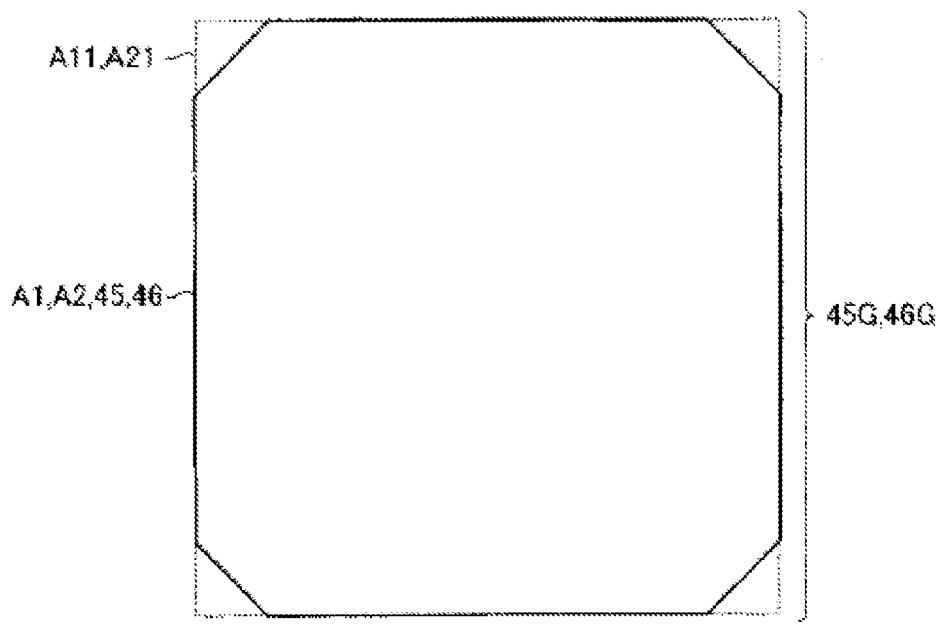
FIG. 14A shows the relationship between the contour of a current collector 45G and a region A1 in the case where the number of current collectors 45 forming the current collector 45G is varied.

As shown in FIG. 14A, the current collector 45G is formed of a single current collector (first unit collector) 45; the second current collector 46G is formed of a single current collector (second unit collector) 46; and the contours of the current collector 45 and the second current collector 46 coincide with the regions A1 and A2.

Figure 14B:
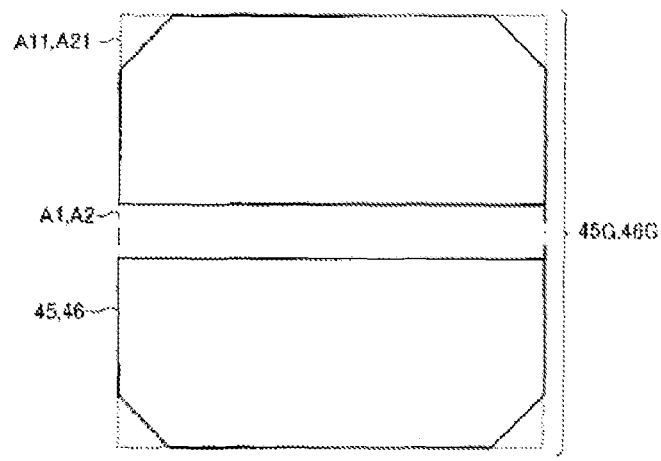
FIG. 14B shows the relationship between the contour of a current collector 45G and a region A1 in the case where the number of current collectors 45 forming the current collector 45G is varied.
Figure 14C:
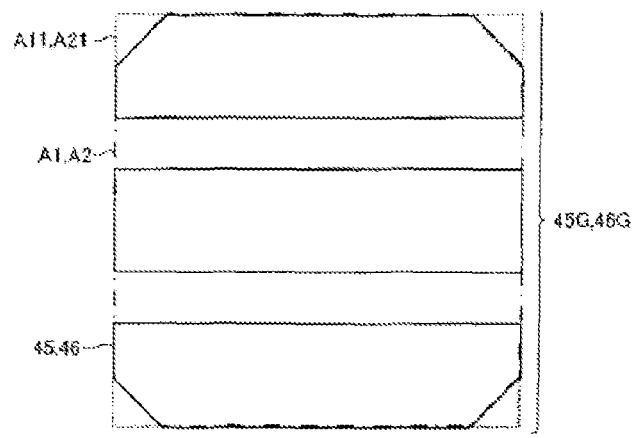
FIG. 14C shows the relationship between the contour of a current collector 45G and a region A1 in the case where the number of current collectors 45 forming the current collector 45G is varied.

As shown in FIG. 14B or 14C, the current collector 45G and the second current collector 46G are respectively formed of two or three current collectors (first unit collectors) 45 and (second unit collectors) 46 which are arranged in a vertical direction.

Figure 15A:
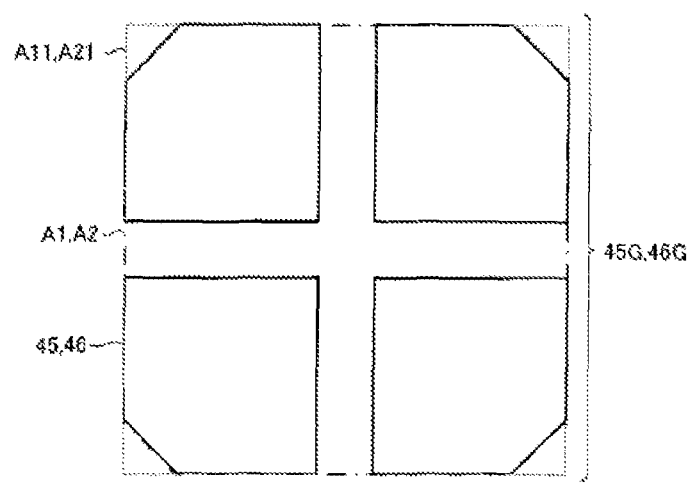
FIG. 15A shows the relationship between the contour of a current collector 45G and a region A1 in the case where the number of current collectors 45 forming the current collector 45G is varied.
Figure 15B:
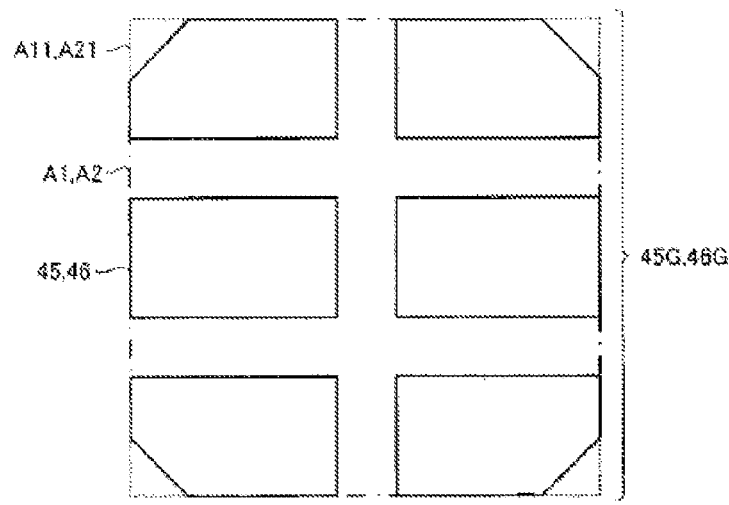
FIG. 15B shows the relationship between the contour of a current collector 45G and a region A1 in the case where the number of current collectors 45 forming the current collector 45G is varied.
Figure 15C:
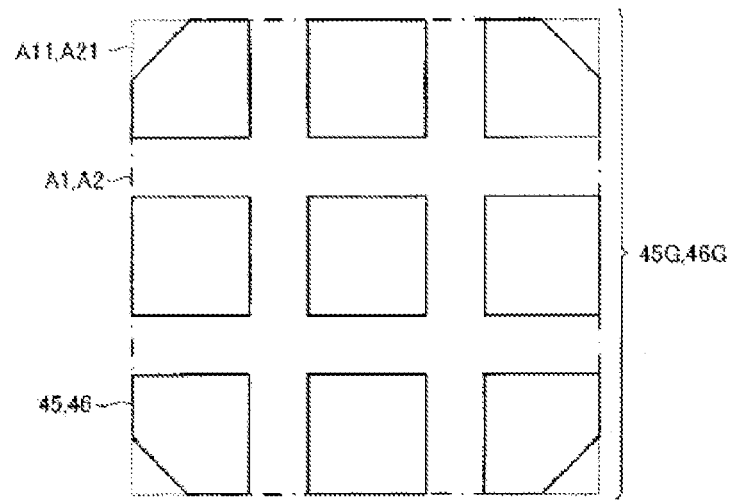
FIG. 15C shows the relationship between the contour of a current collector 45G and a region A1 in the case where the number of current collectors 45 forming the current collector 45G is varied.

As shown in FIGS. 15A to 15C, the current collector 45G and the current collector 46G are respectively formed of a plurality of current collectors 45 and second current collectors 46 which are arranged as follows.

(a) Two collectors in a vertical direction and two collectors in a horizontal direction (total: four collectors).

(b) Three collectors in a vertical direction and two collectors in a horizontal direction (total: six collectors).

(c) Three collectors in a vertical direction and three collectors in a horizontal direction (total: nine collectors).

As described above, any number of current collectors 45 and second current collectors 46 may be applied to the regions A1 and A2, respectively. That is, no particular limitation is imposed on the number of first unit collectors 45 forming the current collector 45G and the number of second unit collectors 46 forming the second current collector 46G. Regardless of the number of unit collectors forming the current collector 45G or the second current collector 46G, stress concentration can be reduced at the corner portions, so long as each of the regions A1 and A2 has a corner-chamfered rectangular boundary.

(Second Embodiment)

Figure 16:
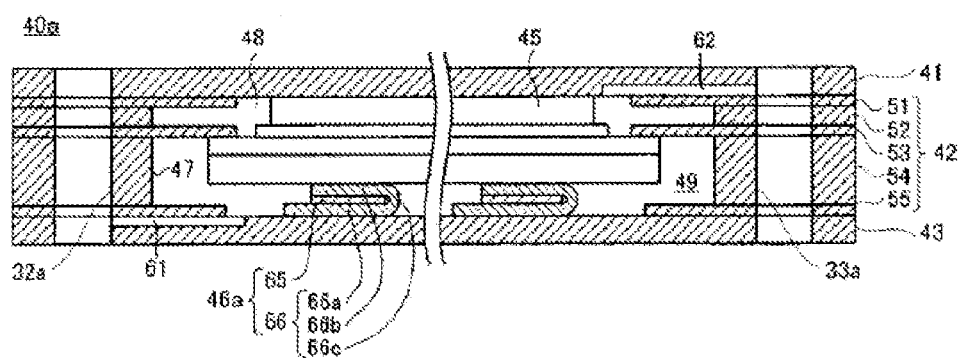
FIG. 16 is a cross-sectional view of a fuel cell 40a of a solid oxide fuel cell 10a according to a second embodiment.

FIG. 16 is a cross-sectional view of a fuel cell 40a of a solid oxide fuel cell 10a according to a second embodiment.

The fuel cell 40a includes a current collector 46a in place of the current collector 46. The current collector 46a is formed of a combination of a spacer 65 and a current collection member 66. The spacer 65 is sandwiched by the bent current collection member 66. Thus, various configurations may be employed for varying the susceptibility of the current collector 45 or 46 to compressive deformation.

The current collection member 66 is formed of, for example, an Ni plate which has been subjected to heating (annealing) under vacuum at 1,000° C. for one hour (HV hardness: 200 or less). The current collection member 66 has a connector abutment portion 66a, a cell main body abutment portion 66b, and a connection portion 66c, the portions 66a to 66c being integrally formed. The connector abutment portion 66a abuts the interconnector 43. The cell main body abutment portion 66b abuts the anode 58 of the cell main body 44. The connection portion 66c has a U-shape and connects the connector abutment portion 66a and the cell main body abutment portion 66b.

The current collection member 66 may be formed of, for example, a foil material having a thickness of about 30 μm. Therefore, the connection portion 66c is bendable and stretchable in a direction crossing with the surface thereof, and exhibits virtually no resistive force against bending or stretching.

The current collection member 66 may be formed of, in place of the aforementioned foil material, for example, porous Ni, Ni mesh, Ni wire, or Ni punching metal. Alternatively, the current collection member 66 may be formed of, in place of Ni, an oxidation-resistant metal such as an Ni alloy or stainless steel.

About several tens to one hundred current collection members 66 are provided in the fuel gas path 49 (the number of the current collection members may vary in association with the size of the fuel gas path 49).

The spacer 65 is provided between the connector abutment portion 66a and the cell main body abutment portion 66b, and exhibits elastic force in a thickness direction. The material of the spacer 65 may be any one species or a combination of a plurality of species selected from among mica, alumina felt, vermiculite, carbon fiber, silicon carbide fiber, and silica. When the spacer 65 is formed of a laminate structure of thin plates (e.g., mica), appropriate elasticity is secured with respect to a load in a lamination direction.

Thus, the current collector 46a exhibiting relatively more susceptible to compressive deformation can be produced by combining the bent current collection member 66 with the spacer 65.

The current collector 46a may be produced through the following procedure.

Figure 17:
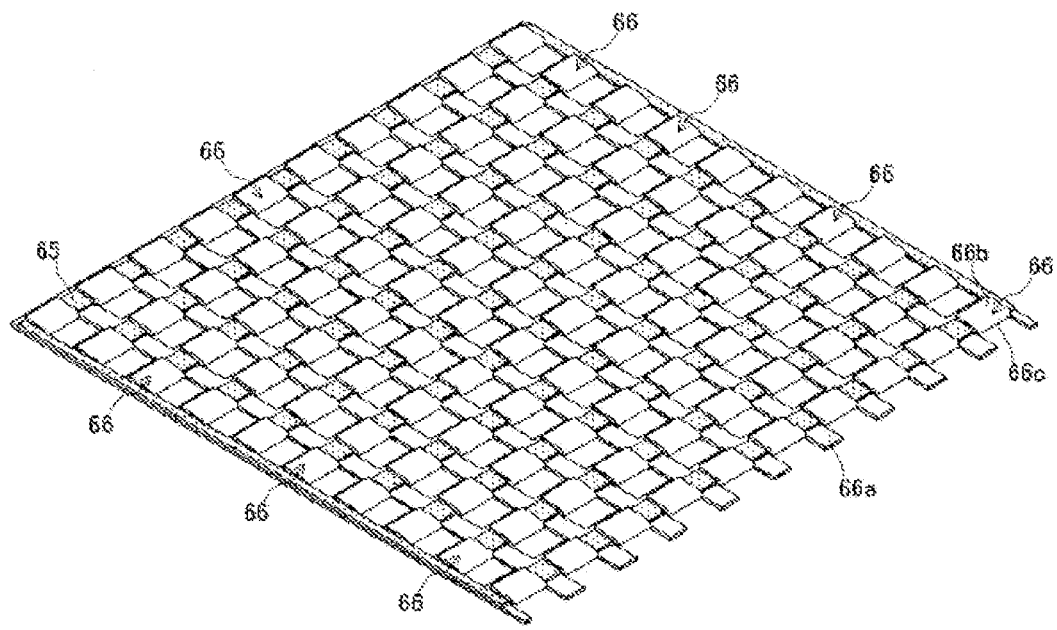
FIG. 17 is a perspective view of a current collector 46a according to the second embodiment.
Figure 18:
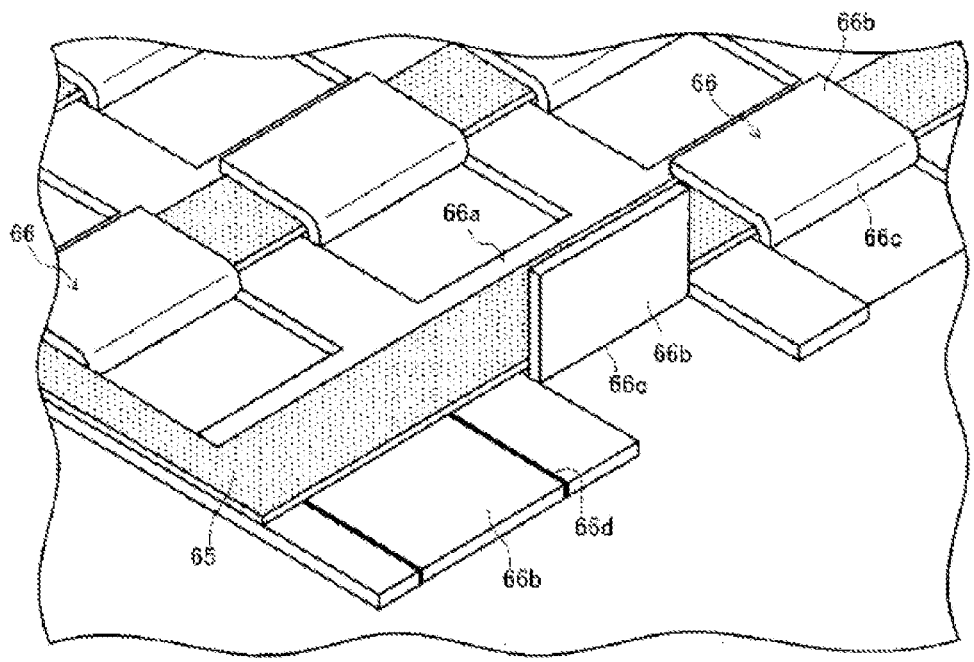

Individual current collection members 66 may be arranged on the interconnector 43 and subjected to welding (e.g., laser welding or resistance welding). More preferably, as shown in FIGS. 17 and 18, a plurality of current collection members 66 are integrally formed.

Figure 19:
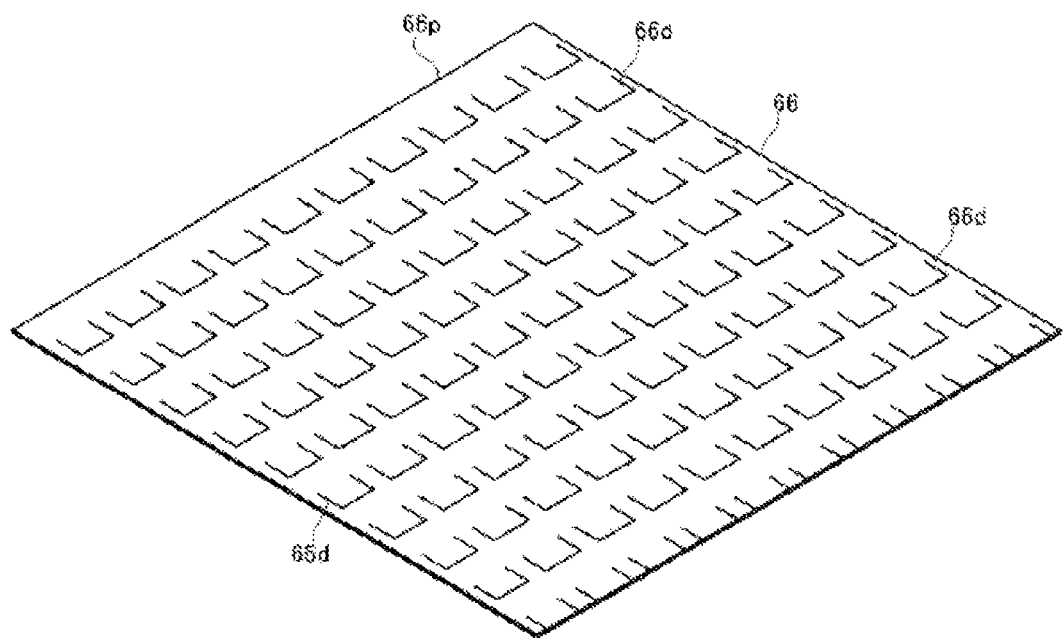
FIG. 19 is a perspective view of a current collection member 66.

Specifically, as shown in FIG. 19, a foil material is processed into a quadrangular flat plate 66p, and pre-cut lines 66d, each corresponding to the cell main body abutment portion 66b and the connection portion 66c, are provided on the flat plate 66p. Then, as shown in FIG. 18, the connection portion 66c is bent to have a U-shaped cross section, such that the cell main body abutment portion 66b is provided above the connector abutment portion 66a. Thus, the flat plate 66p is provided with holes by bending the cell main body abutment portion 66b. The flat plate 66p having holes corresponds to an aggregate of the connector abutment portions 66a.

Figure 20:
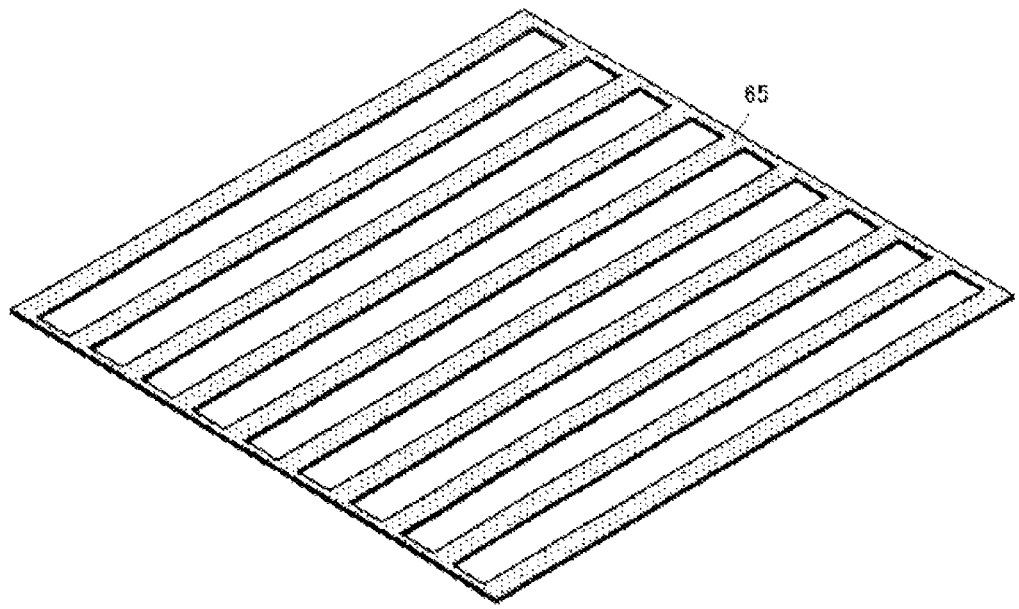
FIG. 20 is a perspective view of a spacer 65.

As shown in FIG. 20, the spacer 65 may be formed from a material sheet having a transverse lattice shape. This quadrangular material sheet has almost the same width as the flat plate 66p and a length slightly smaller than that of the flat plate 66p. The spacer 65 is formed from this material sheet so that portions each corresponding to a single row of the cell main body abutment portions 66b and the connection portions 66c are cut out to be arranged in a transverse lattice form.

The spacer 65 is placed on the flat plate 66p (before processing into the current collection member 66, see FIG. 19), and bent at the connection portions 66c, to thereby produce the current collection member 66 in which the spacer 65 is pre-integrated.

(Other Embodiments)

Embodiments of the present invention are not limited to those described above and may be expanded and modified. The thus-expanded and modified embodiments are also included in the technical scope of the present invention.

In the above-described embodiments, the boundary of a corner portion of the region A2 is located inside the region A2, and the boundary of a portion (other than the corner portion) of the region A2 almost coincides with the boundary of the region A2. However, the entirety or a portion of the boundary of a portion (other than the corner portion) of the region A2 may be located within the region A2.

In the above-described embodiments, the chamfered four corner portions have the same shape and the same amount of chamfering M in each of the regions A1 and A2. However, in each of the regions A1 and A2, some or all of the chamfered corner portions may have different shapes or different amounts of chamfering M.

Also, chamfering of the region A1 may be omitted; i.e., only the region A2 may be chamfered.

In the above-described embodiments, the bolt is in a hollow form (hollow bolt) and serves as a fuel gas or oxidant gas path. However, the bolt may be in a non-hollow form (solid bolt), and a fuel gas or oxidant gas path may be provided outside the bolt.

DESCRIPTION OF REFERENCE NUMERALS

10: solid oxide fuel cell
11, 12: end plate
21, 22: bolt
31, 32: through hole
35: nut
40: fuel cell 41, 43: interconnector
42: frame unit
44: cell main body
45, 46: current collector
47: opening
48: oxidant gas path
48: oxidant gas path
49: fuel gas path
51, 55: insulating frame
52: cathode frame
53: separator
54: anode frame
56: cathode
57: solid electrolyte body
58: anode
61: notch
62: notch
65: spacer
66: current collection member
66a: connector abutment portion
66b: cell main body abutment portion
66c: connection portion
66d: pre-cut line
66p: flat plate

The invention claimed is:

1. A fuel cell comprising:
a flat-plate-like fuel cell main body which is formed by stacking a cathode layer, an electrolyte layer, and an anode layer, whose first main surface is a surface of one of the cathode layer and the anode layer, and whose second main surface is a surface of the other of the anode and cathode layer;
a first current collector which is in contact with the first main surface; and
a second current collector which is in contact with the second main surface, the fuel cell being characterized in that:
the first current collector including one or more first current collectors and the second current collectors including one or more second current collectors,
the second current collector is designed such that the second current collector compressively deforms more easily than the first current collector, and such that:
a first region of the first current collector is defined as an area occupied by the one or more first current collectors and an area between adjacent first current collectors and a second region of the second current collector is defined as an area occupied by the one or more second current collectors and an area between adjacent second current collectors,
as viewed in a thickness direction of the fuel cell main body, at least a portion of a boundary of the second region of the second current collector corresponding to the second main surface is located within a boundary of the first region of the first current collector corresponding to the first main surface, and
the remaining portion of the boundary of the second region is located within the boundary of the first region or on the boundary of the first region.

2. A fuel cell according to claim 1, wherein:
the first region has a first rectangular boundary having a chamfered corner portion, and
the second region has a second rectangular boundary having a chamfered corner portion.

3. A fuel cell according to claim 2, wherein:
as viewed in a thickness direction of the fuel cell main body, the chamfered corner portion of the second rectangular boundary of the second region is located inside the chamfered corner portion of the first rectangular boundary of the first region.

4. A fuel cell according to claim 2, wherein:
at least one of the chamfered corner portions of the first and second rectangular boundaries has a straight-line shape or an arc shape.

5. A fuel cell according to claim 2, wherein the chamfered corner portion of the first and second rectangular boundaries are straightly chamfered or arcuately chamfered to have a rounded corner portion.

6. A fuel cell according to claim 1, which comprises:
a plurality of first current collectors, and a plurality of second current collectors.

7. A fuel cell according to claim 1, wherein:
the first main surface is the surface of the cathode layer and the second main surface is the surface of the anode layer;
the first current collector which is in contact with the first main surface contains stainless steel; and
the second current collector which is in contact with the second main surface contains porous nickel.

8. A fuel cell according to claim 1, wherein:
the first main surface is the surface of the cathode layer and the second main surface is the surface of the anode layer;
the first current collector which is in contact with the first main surface contains stainless steel; and
the second current collector which is in contact with the second main surface is formed by a combination of nickel and mica.

9. A fuel cell according to claim 1, wherein the first main surface is a surface of the cathode layer and the second main surface is a surface of the anode layer.

* * * * *